No. 673,051.  
C. M. FURGASON.  
Patented Apr. 30, 1901.
EQUALIZING ATTACHMENT FOR VEHICLES.
(Application filed Feb. 5, 1901.)
(No Model.)
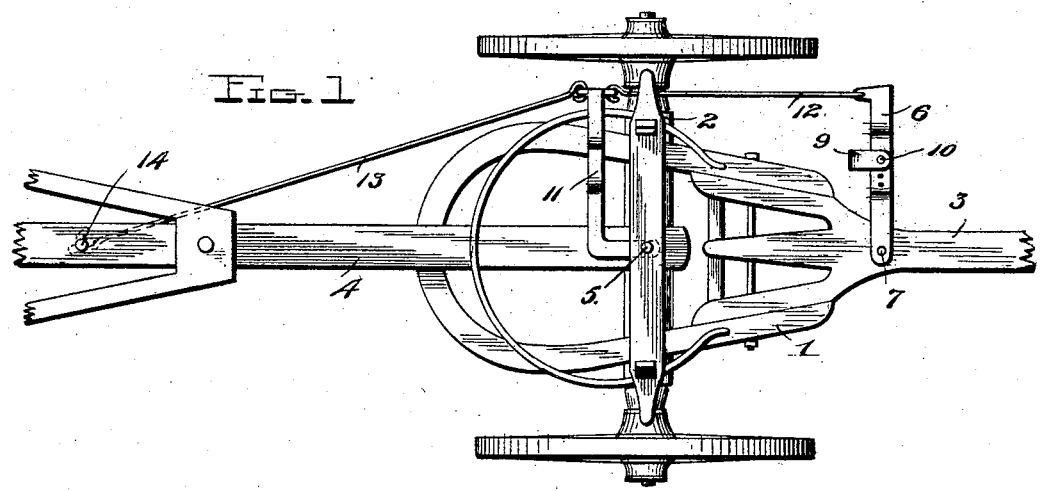
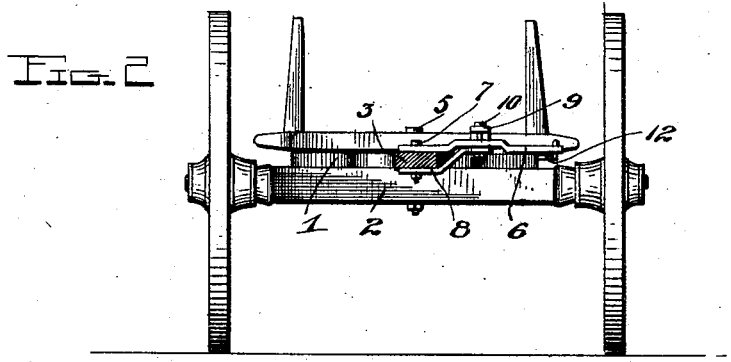
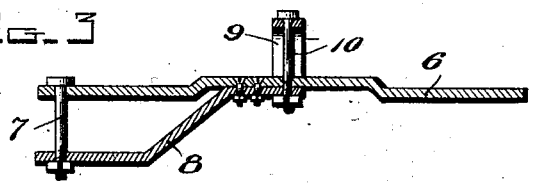
Inventor  
C. M. Furgason
Witnesses  
By  
Attorneys
THE NORRIS PETERS CO., PHOTO-LITHO., WASHINGTON, D. C.

UNITED STATES PATENT OFFICE.

CHARLES M. FURGASON, OF ANTHON, IOWA.

EQUALIZING ATTACHMENT FOR VEHICLES.

SPECIFICATION forming part of Letters Patent No. 673,051, dated April 30, 1901.

Application filed February 5, 1901. Serial No. 46,093. (No model.)

*To all whom it may concern:*

Be it known that I, CHARLES M. FURGASON, a citizen of the United States, residing at Anthon, in the county of Woodbury and State of Iowa, have invented certain new and useful Improvements in Equalizer Attachments for Vehicles; and I do declare the following to be a full, clear, and exact description of the invention, such as will enable others skilled in the art to which it appertains to make and use the same.

This invention relates to an attachment for vehicles whereby an ordinary three-horse equalizer may be connected thereto and worked without causing side draft on the tongue of the vehicle; and it consists of certain novel features of construction, combination, and arrangement of parts, which will be hereinafter more fully described, and particularly pointed out in the appended claim.

In the accompanying drawings, Figure 1 is a top plan of a portion of the running-gear of a lumber-wagon or other vehicle, showing the application of the invention thereto. Fig. 2 is a front elevation thereof. Fig. 3 is a detail cross-section through the draft-bar, showing the clevis.

Referring to the drawings, the numeral 1 designates the front hounds, 2 the front axle, 3 the tongue, 4 the reach, and 5 the king-bolt, of a lumber or other wagon or vehicle.

The equalizer attachment comprises a draw-bar 6, connected at one end by a bolt 7 to the tongue and extending laterally at one side thereof. This bar is braced by a brace-bar 8, secured at one end by the bolt 7, thence extending beneath the bar 6, and having at its outer end a clevis 9, which projects over said bar 7. Through this clevis, the bar 7, and the brace 8 passes a bolt 10, which connects them. The bolts 7 and 10 are the usual hammer-bolts, which in practice pass through the hammer-holes of the wagon.

11 represents a thrust-bar connected at its inner end to the king-bolt 5 and projecting laterally parallel with the draw-bar 6, which is connected thereto by a draft-rod 12. 13 is a second draft-rod connected at its forward end to the outer end of the bar 11 and thence extending rearwardly and diagonally and connected at its rear end by a bolt 14 to the reach 4.

In practice an ordinary three-horse equalizer is connected to the clevis 9, and by the described construction of the parts of the attachment the center of the draft is thrown at one side of the tongue, at 10, shared by the tongue 3, at 7, and the draft-rods 12 and 13. Now as the rod 12 is arranged parallel with the tongue it will be seen that the draft at 7 is also thrown parallel with the tongue, thereby obviating all liability of side draft.

Having thus fully described my invention, what I claim as new, and desire to secure by Letters Patent, is—

In a draft connection for attaching equalizers to vehicles, the combination, with the running-gear of a vehicle, of a draw-bar connected to and extending laterally from the tongue and having a clevis for the attachment of an equalizer, a thrust-bar connected to the king-bolt and extending laterally parallel with the draw-bar, a draft-rod extending parallel with the tongue and connecting the outer ends of the draw and thrust bars, and a draft-rod connecting said thrust-bar with the reach, substantially as described.

In testimony whereof I have hereunto set my hand in presence of two subscribing witnesses.

CHARLES M. FURGASON.

Witnesses:
 A. OLSSON,
 H. B. WALLING.